(12) United States Patent
Zhong et al.

(10) Patent No.: US 11,550,920 B2
(45) Date of Patent: Jan. 10, 2023

(54) DETERMINATION APPARATUS, DETERMINATION METHOD, AND DETERMINATION PROGRAM

(71) Applicant: NIPPON TELEGRAPH AND TELEPHONE CORPORATION, Tokyo (JP)

(72) Inventors: Yang Zhong, Musashino (JP); Tohru Sato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 379 days.

(21) Appl. No.: 16/479,924

(22) PCT Filed: Jan. 26, 2018

(86) PCT No.: PCT/JP2018/002532
§ 371 (c)(1),
(2) Date: Jul. 23, 2019

(87) PCT Pub. No.: WO2018/143097
PCT Pub. Date: Aug. 9, 2018

(65) Prior Publication Data
US 2019/0370476 A1 Dec. 5, 2019

(30) Foreign Application Priority Data
Jan. 31, 2017 (JP) .............................. JP2017-015951

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS 8,448,242 B2 * 5/2013 Stolfo ................... G06F 21/564
726/22
9,479,526 B1 * 10/2016 Yang ....................... G06F 21/50
(Continued)

FOREIGN PATENT DOCUMENTS

JP 2009-015570 A 1/2009

OTHER PUBLICATIONS

International Search Report and Written Opinion dated Apr. 3, 2018 for PCT/JP2018/002532 filed on Jan. 26, 2018, 9 pages including English Translation of the International Search Report.
(Continued)

*Primary Examiner* — Fatoumata Traore
(74) *Attorney, Agent, or Firm* — Xsensus LLP

(57) ABSTRACT

A determination apparatus includes a keyword extraction unit that extracts keywords characterizing a vulnerability from known vulnerability information, and a 0-day attack determination unit that compares the keywords characterizing the vulnerability and keywords included in a request used for an attack, and when a value of a score indicating a degree of inclusion of same keywords as the keywords characterizing the vulnerability in the request is smaller than a predetermined threshold, determines that the request is a 0-day attack that is neither a known attack nor an attack similar to the known attack.

7 Claims, 6 Drawing Sheets

(56) References Cited

U.S. PATENT DOCUMENTS

| | | | | |
|---|---|---|---|---|
| 2003/0233581 A1* | 12/2003 | Reshef | ............... | G06F 21/554 |
| | | | | 726/25 |
| 2011/0283360 A1* | 11/2011 | Abadi | ............... | H04L 63/1416 |
| | | | | 726/24 |
| 2011/0289582 A1* | 11/2011 | Kejriwal | ............... | G06F 21/566 |
| | | | | 726/22 |
| 2014/0283083 A1 | 9/2014 | Gula et al. | | |
| 2014/0380473 A1* | 12/2014 | Bu | ............... | G06F 21/566 |
| | | | | 726/23 |
| 2016/0140344 A1* | 5/2016 | Sato | ............... | G06F 21/577 |
| | | | | 726/22 |

OTHER PUBLICATIONS

Jimbo et al., "Detecting Zero day remote Exploit Attack by Honeypot Traffic Analysis", Proceedings of the 2012 Symposium on Cryptography and Information Security, Abstract of the 29th Symposium on Cryptography and Information Security, Jan. 30, 2012, pp. 1-8 (With English Translation).

Kruegel et al., "Anomaly Detection of Web-based Attacks", Proceedings of the 10th ACM conference on Computer and communications security, ACM, 2000, pp. 251-261.

Sans, "Detecting Attacks on Web Applications from Log Files", Available at link <https://www.sans.org/reading-room/whitepapers/logging/detecting-attacks-web-applications-log-files-2074>, Jan. 26, 2008, pp. 1-44.

Zhong et al., "An Actual Survey on Web Scanning by URI Co-occurrence Detection", The institute of Electronics, Information and Communication Engineers, Technical Report of IEICE, 2016, pp. 1-6.

\* cited by examiner

DETERMINATION APPARATUS, DETERMINATION METHOD, AND DETERMINATION PROGRAM

CROSS-REFERENCE TO RELATED APPLICATIONS

The present application is based on PCT filing PCT/JP2018/002532, file Jan. 26, 2018, which claims priority to JP 2017-015951, filed Jan. 31, 2017, the entire contents of each are incorporated herein by reference.

FIELD

The present invention relates to a determination apparatus, a determination method, and a determination program.

BACKGROUND

As a conventional attack detection technique and vulnerability determination technique for web applications, an anomaly detection technique, a vulnerability management technique, and the like have been known. The anomaly detection technique is a technique of learning models indicating normal accesses in advance, and detecting abnormal accesses by comparison with the models. Further, the vulnerability management technique is a technique of determining presence or absence of a vulnerability from versions or the like of systems or applications.

CITATION LIST

Patent Literature

Patent Literature 1: Japanese Laid-open Patent Publication No. 2009-15570
Non Patent Literature 1: Christopher Kruegel, and Giovanni Vigna. "Anomaly Detection of Web-based Attacks." Proceedings of the 10th ACM conference on Computer and communications security. ACM, 2003.
Non Patent Literature 2: Detecting Attacks on Web Applications from Log Files, SANS, [searched on Jan. 17, 2017], the Internet <URL: https://www.sans.org/reading-room/whitepapers/logging/detecting-attacks-web-applications-log-files-2074>
Non Patent Literature 3: Yang Zhong, et al. "An Actual Survey on Web Scanning by URI Co-occurrence Detection" Technical Report Security Psychology & Trust (SPT), IEICE technical report 2016.5 (2016): 1-6.

SUMMARY

Technical Problem

However, abnormal accesses to be detected by the anomaly detection technique include not only 0-day attacks (attacks for which countermeasures are not established), but also subspecific attacks of known attacks (attacks for which countermeasures are established). Therefore, when using the anomaly detection technique, it is difficult to determine whether a detected abnormal access is a 0-day attack or not. Further, when using the vulnerability management technique, it is possible to determine whether an attack is an attack against a known vulnerability, but it is difficult to determine whether the attack is a 0-day attack.

Therefore, for example, after detecting an attack, an analyst or the like needs to start operation from determination of whether the attack is a 0-day attack or not, and this causes a delay in dealing with the attack, which is a problem. Therefore, the present invention is made to solve the problem as described above and to determine whether an attack is a 0-day attack or not.

Solution to Problem

To solve the above-described problems, the present invention is a determination apparatus comprising: a memory; and a processor coupled to the memory and programmed to executes a process comprising: a keyword extraction unit configured to extract extracting keywords characterizing a vulnerability from known vulnerability information; and a determination unit configured to compare comparing the keywords characterizing the vulnerability and keywords included in a request used for an attack, and when a value of a score indicating a level of degree of inclusion of same keywords as the keywords characterizing the vulnerability in the request is smaller than a predetermined threshold, determine determining that the request is a 0-day attack that is neither a known attack nor an attack similar to the known attack.

Advantageous Effects of Invention

According to the present invention, it is possible to determine whether an attack is a 0-day attack or not.

DESCRIPTION OF EMBODIMENTS

Modes (embodiments) for carrying out the present invention will be described below with reference to the drawings. The present invention is not limited to the embodiments. Meanwhile, a 0-day attack in the description below indicates an attack that is neither a known attack nor a subspecific attack of the known attack (an attack similar to the known attack).

Figure 1:
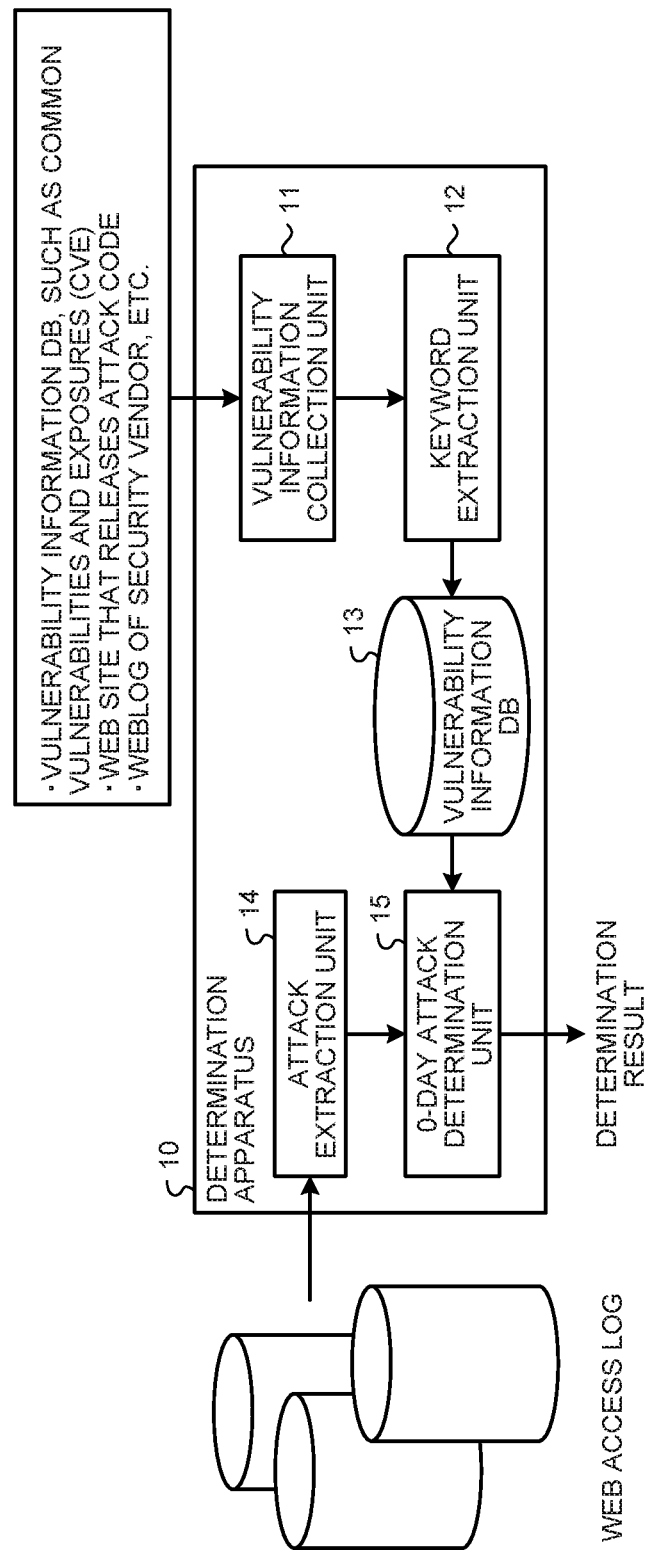
FIG. 1 is a diagram illustrating a configuration example of a determination apparatus.

An outline of a determination apparatus 10 of an embodiment will be described with reference to FIG. 1. The determination apparatus 10 collects information on a known vulnerability, extracts a keyword that characterizes the known vulnerability from the collected information on the known vulnerability, and stores the keyword in a vulnerability information database (DB) 13.

Thereafter, upon extracting a request that serves as an attack from an access log (Web access log) with respect to a plurality of Web sites, the determination apparatus 10 performs matching with the keyword that is stored in the vulnerability information DB 13 and that characterizes the known vulnerability. Then, as a result of the matching, if the attack is neither a known attack nor an attack similar to the known attack, the determination apparatus 10 determines that the attack is a 0-day attack. In contrast, as a result of the matching, if the attack is a known attack or a subspecific attack of the known attack, the determination apparatus 10 does not determine that the attack is a 0-day attack.

The determination apparatus 10 as described above includes a vulnerability information collection unit 11, a keyword extraction unit 12, the vulnerability information DB 13, an attack extraction unit 14, and a 0-day attack determination unit 15.

The vulnerability information collection unit 11 collects information on a known vulnerability. For example, the vulnerability information collection unit 11 collects vulnerability information on a web application from a vulnerability information DB, such as a Common Vulnerabilities and Exposures (CVE), a Web site that releases an attack code, a weblog of a security vendor, and the like.

The vulnerability information to be collected is, for example, a date of discovery of a vulnerability, a release date, a web application name, a version of a web application, a type of a vulnerability, a file name of a web application in which a vulnerability exists, a function name, information on a request used for an attack, a verification code, a reference, and the like, but is not limited thereto.

The keyword extraction unit 12 extracts a keyword that characterizes the vulnerability from the vulnerability information collected by the vulnerability information collection unit 11. For example, the keyword extraction unit 12 extracts a keyword that characterizes the vulnerability from a request URL path, a URL parameter, a header, a Cookie portion, etc. in information on a request used for an attack against the vulnerability or in a verification code, in the vulnerability information collected by the vulnerability information collection unit 11. Then, the keyword extraction unit 12 stores the extracted keyword in the vulnerability information DB 13.

For example, the keyword extraction unit 12 extracts, as keywords, portions other than symbols, such as "/?&=#", from a request URL path in the above-described information or the verification code. As one example, the keyword extraction unit 12 eliminates "http://localhost/" and extracts, as keywords, (wp-content, plugins, wp-mobile-detector, and resize.php) from a request URL path of http://localhost/wp-content/plugins/wp-mobile-detector/resize.php.

For another example, the keyword extraction unit 12 extracts, as a keyword, a URL parameter name from a request URL parameter in the above-described information or the verification code. As one example, the keyword extraction unit 12 extracts, as a keyword, a URL parameter name of (src) from a request URL parameter of http://localhost/wp-content/plugins/wp-mobile-detector/reisze.php?src=xxx.

For still another example, the keyword extraction unit 12 extracts, as a keyword" a header name of a request header in the above-described information or the verification code. As one example, the keyword extraction unit 12 extracts, as keywords, header names of (user-agent, accept, host, and x-app-id) from a request header of User-Agent: Firefox, Accept: */*, Host: www.example.com, X-APP-ID: 1234.

For still another example, the keyword extraction unit 12 extracts, as a keyword, a request cookie name of the request header in the above-described information or the verification code. As one example, the keyword extraction unit 12 extracts, as a keyword, a cookie name of (wp_user_nonce) from Cookie: wp_user_nonce=1234 of the request header.

Meanwhile, the keyword extraction unit 12 may eliminate a common word (for example, a word that frequently appears in those other than a request that serves as an attack against a vulnerability) from the keywords extracted as described above. For example, the keyword extraction unit 12 eliminates a common word using Inverse Document Frequency (IDF) or an elimination filter that is prepared in advance from the keywords that are extracted from the above-described information or the verification code.

As one example, the keyword extraction unit 12 eliminates a common word of plugins from the keywords of (wp-content, plugins, wp-mobile-detector, and resize.php) that are extracted from the request URL path, and obtains the keywords of (wp-content, wp-mobile-detector, and resize.php). Further, the keyword extraction unit 12 maintains the keyword of (src) extracted from the request URL parameter as (src) because it does not include a common word.

Furthermore, the keyword extraction unit 12 eliminates common words of user-agent, accept, and host from the keywords of (user-agent, accept, host, and x-app-id) that are extracted from the request header, and obtains the keyword of (x-app-id). Moreover, the keyword of (wp_user_nonce) extracted from the request cookie name is maintained as (wp_user_nonce) because it does not include a common word.

Figure 2:
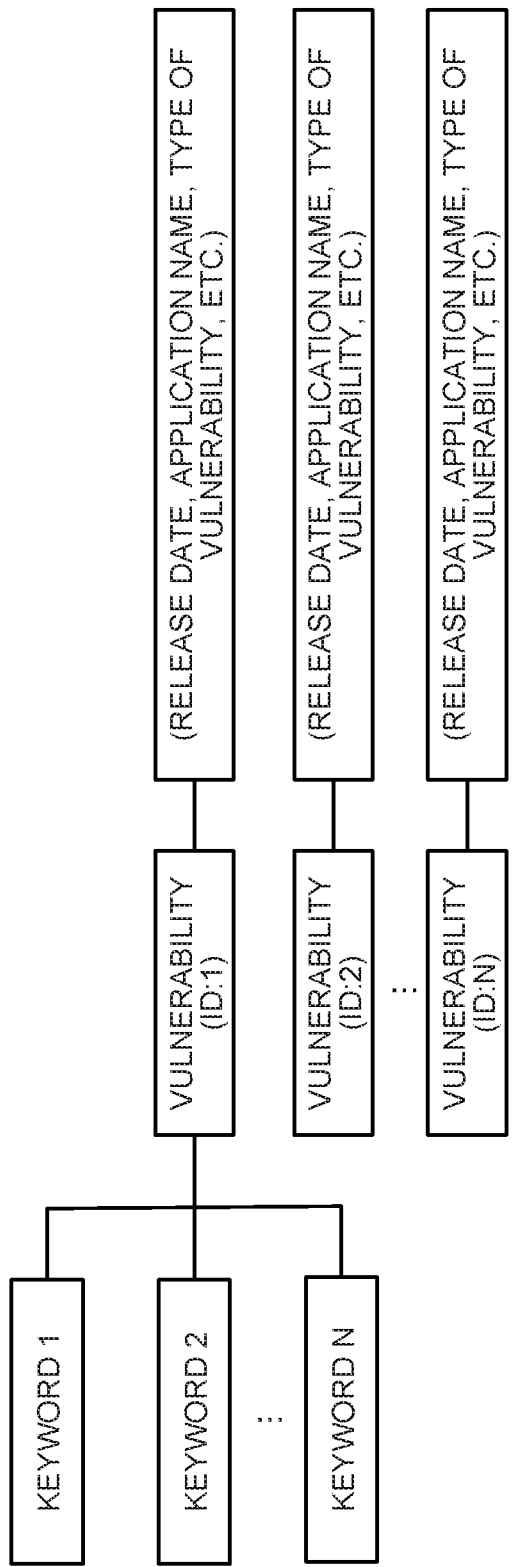
FIG. 2 is a diagram illustrating an example of a vulnerability information DB in the determination apparatus in FIG. 1.

The vulnerability information DB 13 is information in which each of vulnerabilities is associated with a keyword that characterizes the vulnerability. For example, as illustrated in FIG. 2, the vulnerability information DB 13 is information in which identification information (ID) on a vulnerability, a keyword that characterizes the vulnerability, and contents of the vulnerability (for example, a vulnerability release date, an application name, a type of the vulnerability, etc) are associated. In the vulnerability information DB 13 illustrated in FIG. 2, a vulnerability (ID: 1) is associated with contents of the vulnerability (a release date of ID: 1, an application name, a type of the vulnerability, etc.), and keywords (a keyword 1, a keyword 2, . . . , a keyword N) that characterize the vulnerability (ID: 1).

The attack extraction unit 14 extracts a request that is determined as an attack (an attack request) from an access log (Web access log) with respect to a plurality of Web sites. For example, the attack extraction unit 14 extracts an attack request by using one or a combination of attack detection methods, such as anomaly detection (see Non Patent Document 1), determination using an HTTP status code (see Non Patent Document 2), and URI co-occurrence detection in a request (see Non Patent Document 3).

Meanwhile, the anomaly detection is a method of detecting a request as an attack when a deviation from contents of a learned request is large, and the determination using the HTTP status code is a method of detecting an attack using such characteristics that an attack against a web application is generally likely to fail and the HTTP status code becomes 400s to 500s indicating an error when the attack fails. Further, the URI co-occurrence detection in a request is a method of detecting an attack from high co-occurrence using such characteristics that an attack against a web application is generally performed against a plurality of Web sites and it is highly likely that a request common to the Web sites appears.

The 0-day attack determination unit 15 determines whether the request that has been determined as an attack by the attack extraction unit 14 is a 0-day attack or not, and outputs a determination result. Specifically, the 0-day attack determination unit 15 compares keywords that are stored in the vulnerability information DB 13 and that characterize a vulnerability with keywords that are included in the request that has been determined as an attack, and calculates a value of a score indicating a level of degree of inclusion of the same keywords as the keywords characterizing the vulnerability in the request. Then, if the calculated value of the score is smaller than a predetermined threshold, the 0-day attack determination unit 15 determines that the request is a 0-day attack. In contrast, if the calculated value of the score is equal to or larger than the predetermined threshold, the 0-day attack determination unit 15 determines that the request is an attack against a known vulnerability or a subspecific attack of the known attack.

One example will be described. For example, assuming that the number of keywords that are stored in the vulnerability information DB 13 in association with a certain vulnerability is denoted by Nk, and the number of keywords that match the request that has been determined as an attack by the attack extraction unit 14 among the Nk keywords is denoted by Nm, a score is calculated such that S=Nm/Nk. Here, if the calculated score S is equal to or larger than a threshold T that is determined in advance (if a similarity to an attack against a known vulnerability is high), the 0-day attack determination unit 15 determines that the request is an attack against the vulnerability that is associated with the keywords. In other words, the 0-day attack determination unit 15 determines that the request is an attack against a known vulnerability or a subspecific attack of the attack. In contrast, if the calculated score S is smaller than the threshold T (if the similarity to the attack against the known vulnerability is low), the 0-day attack determination unit 15 determines that the request is neither an attack against the known vulnerability (known attack) nor a subspecific attack of the known attack, that is, determines that the request is a 0-day attack.

Meanwhile, when performing matching (comparison) between the keywords included in the request that has been determined as an attack and the keywords stored in the vulnerability information DB 13, the 0-day attack determination unit 15 performs matching between keywords in the same field (for example, a URL path, a parameter, a header, a cookie portion, or the like), for example. For example, the 0-day attack determination unit 15 performs matching between keywords that are extracted from a URL path of the request that has been determined as an attack and keywords of a URL path of a request in the vulnerability information DB 13, but does not perform matching with keywords in other portions (for example, a parameter, a header, a cookie portion, and the like).

With this configuration, the 0-day attack determination unit 15 is able to determine whether the request that has been determined as an attack is a 0-day attack or not with accuracy.

Meanwhile, the value of the score S as described above may be, for example, the number of keywords that are the same as the keywords stored in the vulnerability information DB 13 and that are included in the request that has been determined as an attack (the number of matches), or may be a value that is obtained by taking into account a length of a matched keyword with respect to a keyword that matches the keyword stored in the vulnerability information DB 13.

(Flow of Process)

Next, an example of the flow of a process performed by the determination apparatus 10 will be described with reference to FIG. 3. Meanwhile, it is assumed that, before the process, the vulnerability information collection unit 11 collects vulnerability information and the keyword extraction unit 12 stores a keyword that characterizes each of vulnerabilities in the vulnerability information DB 13 based on the collected vulnerability information. Further, it is assumed that the attack extraction unit 14 already extracts a request that is determined as an attack (attack request) from a Web access log or the like.

Figure 3:
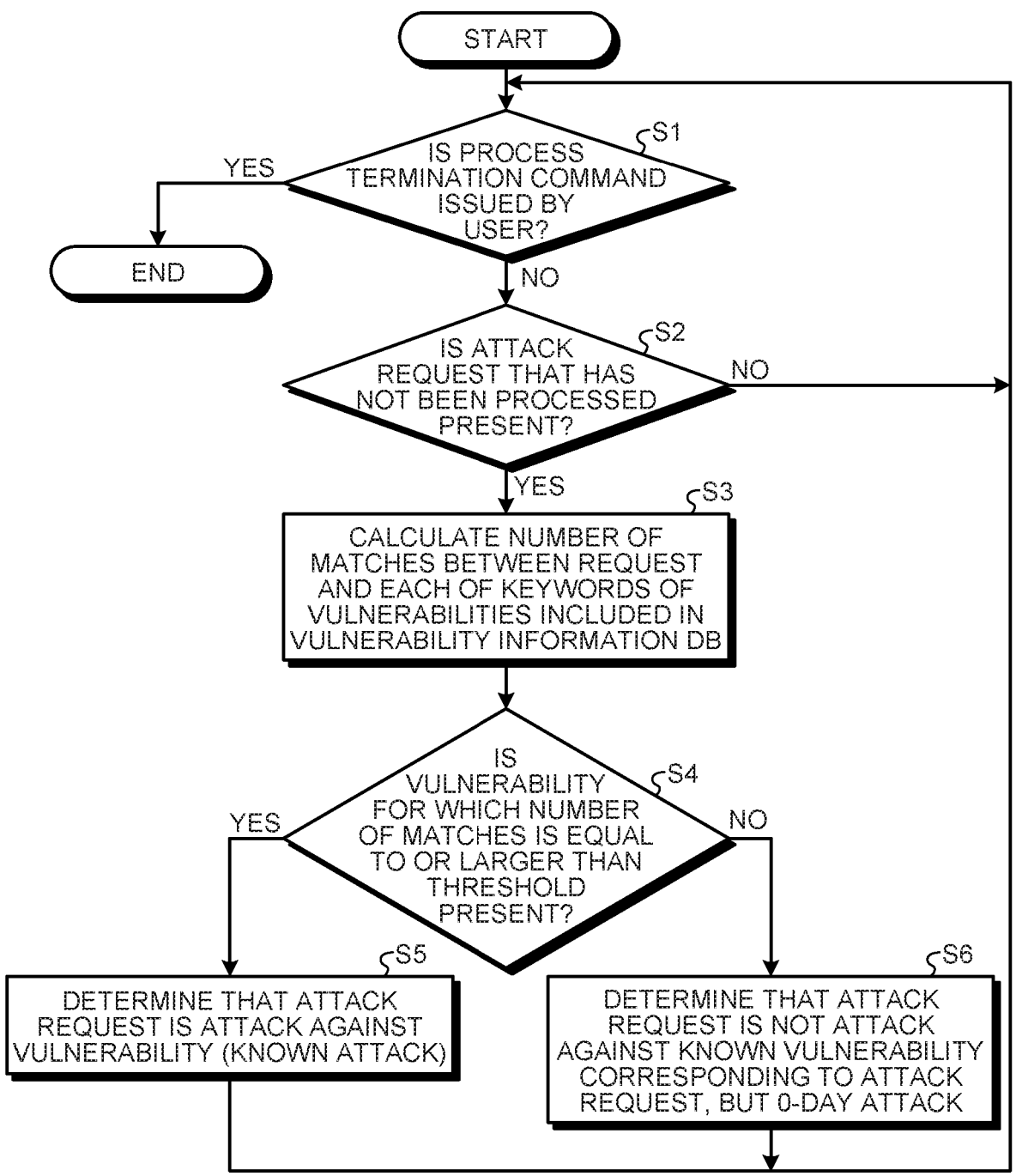
FIG. 3 is a diagram illustrating an example of the flow of a process performed by the determination apparatus in FIG. 1.

As illustrated in FIG. 3, if a process termination command is not issued by a user (NO at S1), and if an attack request that has not been processed is present (YES at S2), the 0-day attack determination unit 15 of the determination apparatus 10 calculates the number of matches between the request and each of the keywords of the vulnerabilities included in the vulnerability information DB 13 (S3). Then, if a vulnerability for which the number of matches is equal to or larger than the threshold T is present (YES at S4), the 0-day attack determination unit 15 determines that the attack request is an attack against the vulnerability (known attack) (S5). In contrast, if a vulnerability for which the number of matches is equal to or larger than the threshold T is not present (NO at S4), the 0-day attack determination unit 15 determines that the attack request is not a known attack corresponding to the attack request, but a 0-day attack (S6). Meanwhile, if the determination apparatus 10 receives the process termination command from the user (YES at S1), the processes from S2 to S6 are not performed and the process is terminated. Further, if an attack request that has not been processed is not present (NO at S2), the 0-day attack determination unit 15 returns to S1.

According to the determination apparatus 10 as described above, it is possible to determine whether an attack is a 0-day attack or not with accuracy. Therefore, after detecting an attack, an analyst or the like need not perform operation of determining whether the attack is a 0-day attack or not, so that the analyst is able to focus on analysis of the 0-day attack. As a result, it is possible to improve efficiency of dealing with (responding) the attack.

(Examples of Operation Performed by Determination Apparatus)

Figure 4:
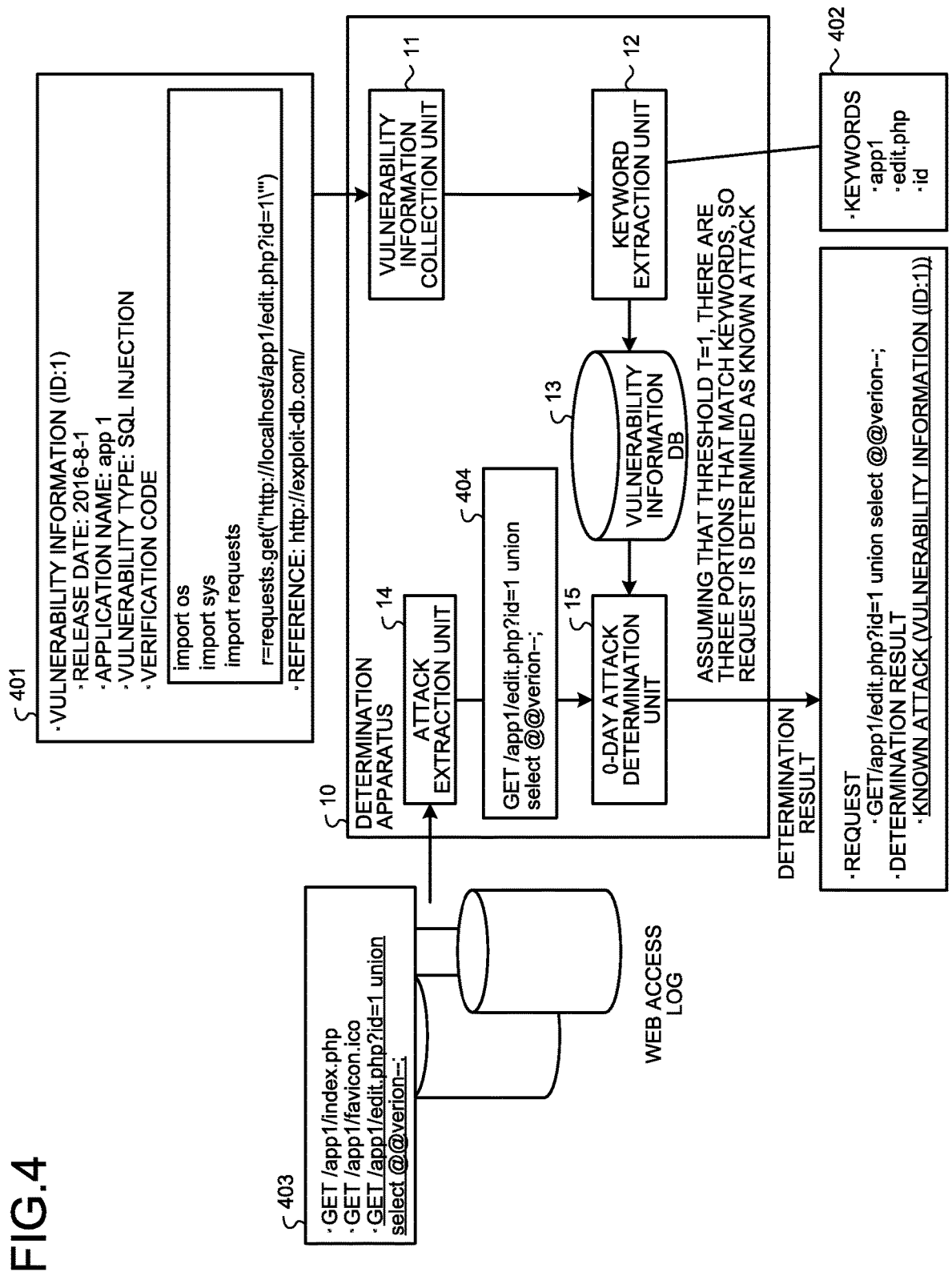
FIG. 4 is a diagram illustrating an example of operation performed by the determination apparatus in FIG. 1.
Figure 5:
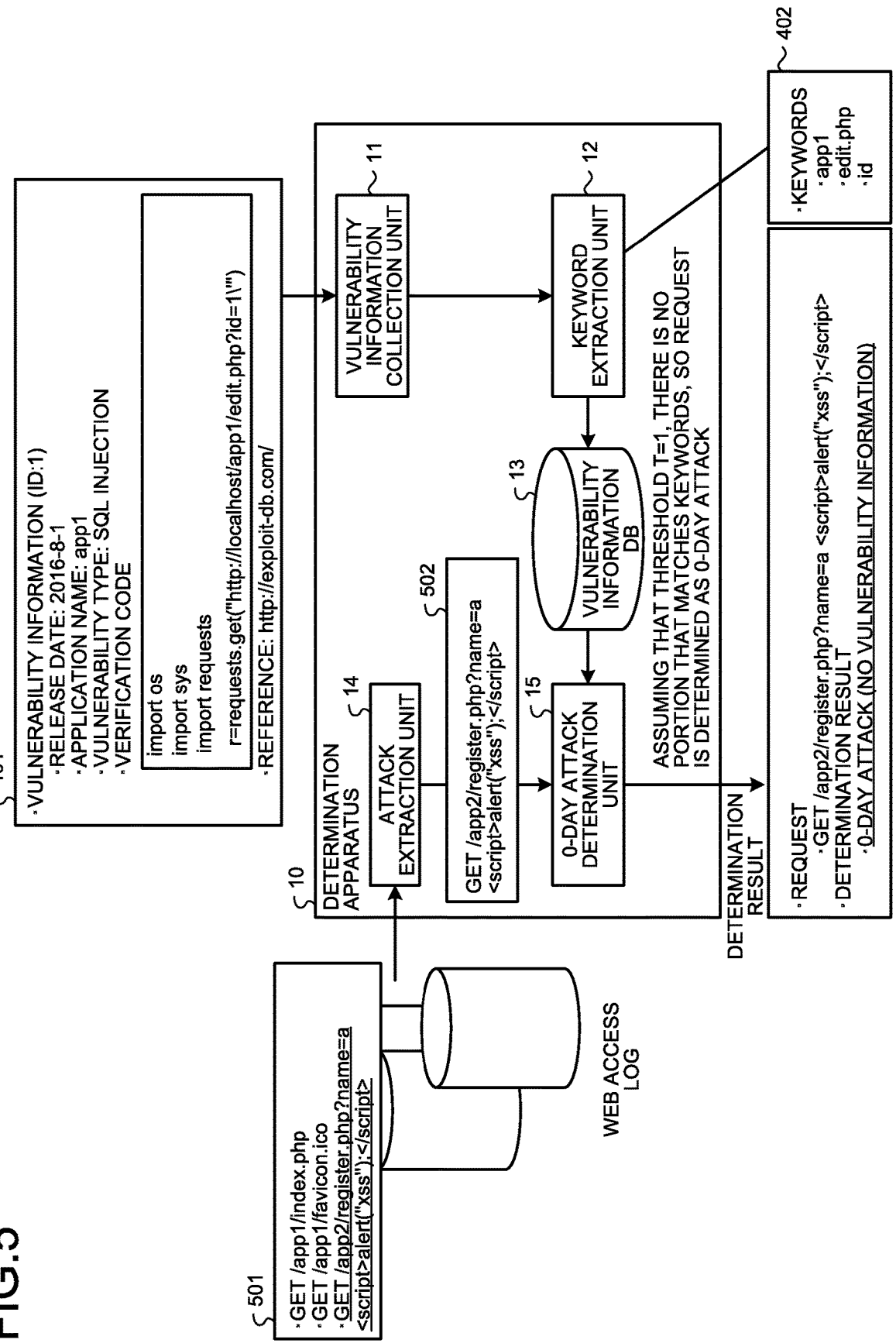
FIG. 5 is a diagram illustrating an example of operation performed by the determination apparatus in FIG. 1.

Next, examples of operation performed by the determination apparatus 10 will be described with reference to FIG. 4 and FIG. 5. For example, as illustrated in FIG. 4 and FIG. 5, when the vulnerability information collection unit 11 collects vulnerability information indicated by a reference number 401, the keyword extraction unit 12 extracts three keywords of (app1, edit.php, and id) indicated by a reference number 402. Then, the keyword extraction unit 12 stores the three keywords of (app1, edit.php, and id), as keywords of the vulnerability information (ID: 1), in the vulnerability information DB 13.

Thereafter, as illustrated in FIG. 4, a case will be described in which the attack extraction unit 14 extracts a request indicated by a reference number 404 as an attack request from a Web access log indicated by a reference number 403. In this case, the 0-day attack determination unit 15 performs matching between the attack request and the three keywords of (app1, edit.php, and id) of the vulnerability information (ID: 1). Assuming that the threshold T=1, there are three portions that match the keywords, so that the request is determined as a known attack. Then, the 0-day attack determination unit 15 outputs a determination result indicating a known attack that is indicated by the vulnerability information (ID: 1), with respect to a request of "GET/app1/edit.php?id=1 union select @@verion--;".

In contrast, as illustrated in FIG. 5, a case will be described in which the attack extraction unit 14 extracts a request indicated by a reference number 502 as an attack request from a Web access log indicated by a reference number 501. In this case, the 0-day attack determination unit 15 performs matching between the attack request and the three keywords of (app1, edit.php, and id) of the vulnerability information (ID: 1). Assuming that the threshold T=1, there is no portion that matches the keywords, so that the request is determined as a 0-day attack. Then, the 0-day attack determination unit 15 determines that the request is a 0-day attack (there is no vulnerability information) with respect to a request of "GET/app2/register.php?name=a<script>alert("xss");</script>".

With this configuration, the determination apparatus 10 is able to determine whether an attack is a 0-day attack or not.

(Program)

Further, the functions of the determination apparatus 10 described in the above embodiment may be implemented by installing a program that realizes the functions in a desired information processing apparatus (computer). For example, by causing the information processing apparatus to execute the above-described program that is provided as package software or online software, it is possible to cause the information processing apparatus to function as the determination apparatus 10. The information processing apparatus described here include a desktop personal computer or a notebook personal computer. Furthermore, the information processing apparatus further includes a smartphone, a mobile communication terminal, such as a mobile phone or a Personal Handyphone System (PHS), a Personal Digital Assistant (PDA), and the like. Moreover, the determination apparatus 10 may be mounted on a cloud server.

Figure 6:
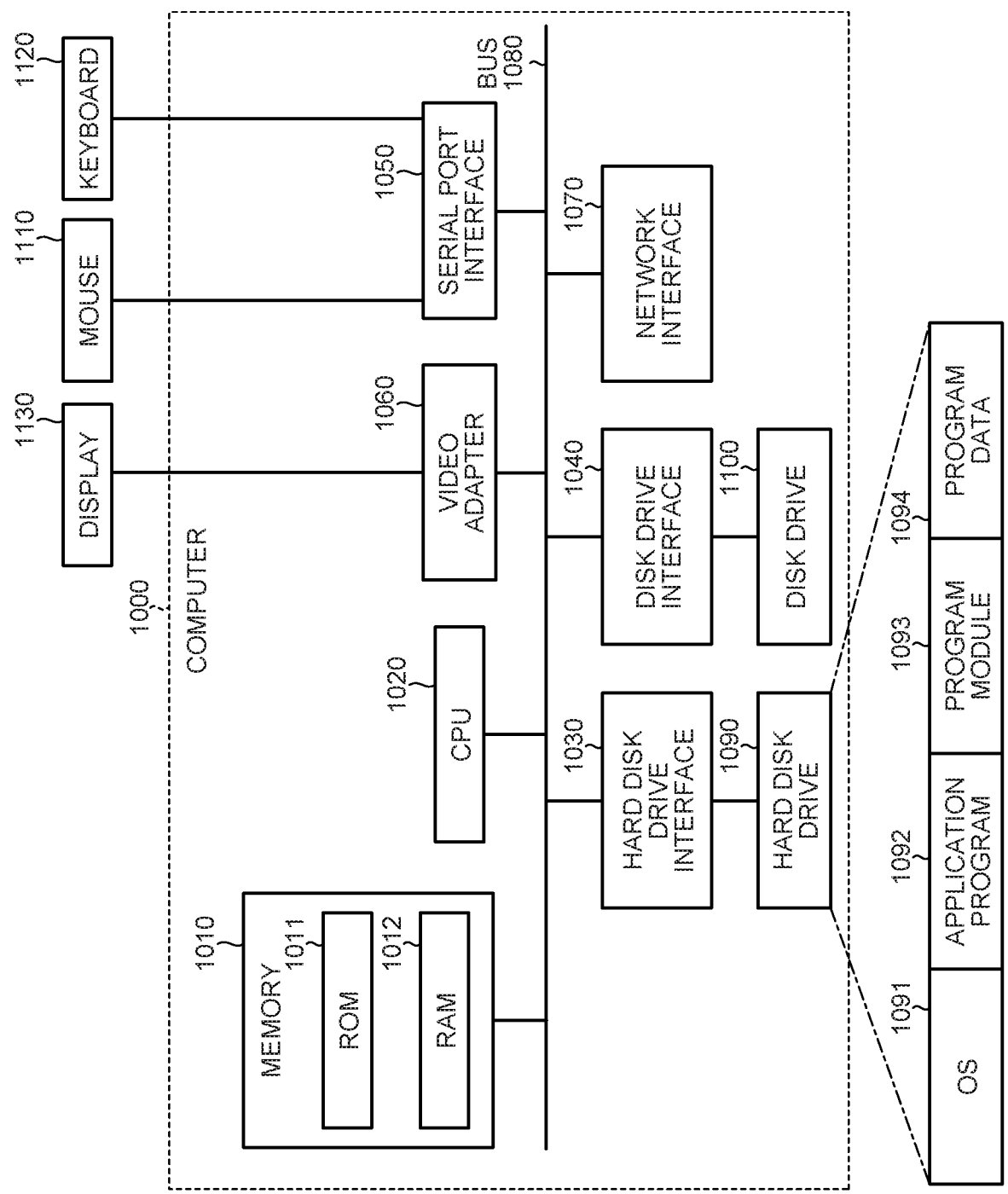
FIG. 6 is a diagram illustrating a computer that executes a determination program.

An example of the computer that executes the program as described above (a determination program) will be described below. FIG. 6 is a diagram illustrating a computer that executes the determination program. As illustrated in FIG. 6, a computer 1000 includes, for example, a memory 1010, a Central Processing Unit (CPU) 1020, a hard disk drive interface 1030, a disk drive interface 1040, a serial port interface 1050, a video adapter 1060, and a network interface 1070. All of the units are connected to one another via a bus 1080.

The memory 1010 includes a Read Only Memory (ROM) 1011 and a Random Access Memory (RAM) 1012. The ROM 1011 stores therein, for example, a boot program, such as a Basic Input Output System (BIOS). The hard disk drive interface 1030 is connected to a hard disk drive 1090. The disk drive interface 1040 is connected to a disk drive 1100. A removable storage medium, such as a magnetic disk or an optical disk, is inserted in the disk drive 1100. A mouse 1110 and a keyboard 1120 are connected to the serial port interface 1050, for example. A display 1130 is connected to the video adapter 1060, for example.

Here, as illustrated in FIG. 6, the hard disk drive 1090 stores therein, for example, an OS 1091, an application program 1092, a program module 1093, and program data 1094. Various kinds of data and information described in the above embodiment are stored in, for example, the hard disk drive 1090 or the memory 1010.

Then, the CPU 1020 reads the program module 1093 and the program data 1094 stored in the hard disk drive 1090 onto the RAM 1012 as needed, and executes the processes as described above.

Meanwhile, the program module 1093 and the program data 1094 related to the determination program need not always be stored in the hard disk drive 1090, but may be stored in a removable storage medium and read by the CPU 1020 via the disk drive 1100 or the like, for example. Alternatively, the program module 1093 and the program data 1094 related to the determination program may be stored in other computers that are connected via a network, such as a Local Area Network (LAN) or a Wide Area Network (WAN), and may be read by the CPU 1020 via the network interface 1070.

REFERENCE SIGNS LIST

10 DETERMINATION APPARATUS
11 VULNERABILITY INFORMATION COLLECTION UNIT
12 KEYWORD EXTRACTION UNIT
13 VULNERABILITY INFORMATION DB
14 ATTACK EXTRACTION UNIT
15 0-DAY ATTACK DETERMINATION UNIT

The invention claimed is:

1. A determination apparatus comprising:
a memory; and
a processor coupled to the memory and programmed to execute a process comprising:
extracting keywords characterizing a vulnerability from known vulnerability information; and
comparing the keywords characterizing the vulnerability and keywords included in a request used for an attack, and when a value of a score indicating a level of degree of inclusion of same keywords as the keywords characterizing the vulnerability in the request is smaller than a predetermined threshold, determining that the request is a 0-day attack that is neither a known attack nor an attack similar to the known attack and which is an attack for which a countermeasure is not established, so as to determine whether the attack is the 0-day attack or not with accuracy, so that efficiency of responding against the attack after detecting the attack is improved, wherein
the determining includes performing matching between keywords that are extracted from a URL path of the request that has been determined as the attack and keywords of a URL path of a request in a Data Base without performing matching with keywords in other portions.

2. The determination apparatus according to claim 1, wherein the value of the score is a ratio of the number of keywords that are the same as the keywords characterizing the vulnerability and that are included in the request to the number of the keywords characterizing the vulnerability.

3. The determination apparatus according to claim 1, wherein when extracting the keywords characterizing the vulnerability from the known vulnerability information, the process further includes extracting, from the known vulnerability information, the keywords in at least one of fields of a URL path, a URL parameter, a header, and a cookie that are included in the request used for an attack against a Web site.

4. The determination apparatus according to claim 3, wherein when comparing the keywords, the process further includes comparing keywords in a same field of an extraction source between the keywords characterizing the vulnerability and the keywords included in the request used for the attack.

5. The determination apparatus according to claim 1, wherein when extracting the keywords characterizing the vulnerability from the known vulnerability information, the process further includes eliminating a keyword that is commonly used for attacks against a plurality of vulnerabilities or eliminating a predetermined keyword that is prepared in advance.

6. A determination method comprising:

extracting keywords characterizing a vulnerability from known vulnerability information; and comparing the keywords characterizing the vulnerability and keywords included in a request used for an attack, and when a score indicating a degree of inclusion of same keywords as the keywords characterizing the vulnerability in the request is smaller than a predetermined threshold, determining that the request is a 0-day attack that is neither a known attack nor an attack similar to the known attack and which is an attack for which a countermeasure is not established, so as to determine whether the attack is the 0-day attack or not with accuracy, so that efficiency of responding against the attack after detecting the attack is improved, wherein the determining includes performing matching between keywords that are extracted from a URL path of the request that has been determined as the attack and keywords of a URL path of a request in a Data Base without performing matching with keywords in other portions.

7. A non-transitory computer-readable recording medium having stored a determination program causing a computer to execute a process comprising:

extracting keywords characterizing a vulnerability from known vulnerability information; and comparing the keywords characterizing the vulnerability and keywords included in a request used for an attack, and when a score indicating a degree of inclusion of same keywords as the keywords characterizing the vulnerability in the request is smaller than a predetermined threshold, determining that the request is a 0-day attack that is neither a known attack nor an attack similar to the known attack and which is an attack for which a countermeasure is not established, so as to determine whether the attack is the 0-day attack or not with accuracy, so that efficiency of responding against the attack after detecting the attack is improved, wherein the determining includes performing matching between keywords that are extracted from a URL path of the request that has been determined as the attack and keywords of a URL path of a request in a Data Base without performing matching with keywords in other portions.

* * * * *